United States Patent [19]

Enderle et al.

[11] Patent Number: 5,195,826
[45] Date of Patent: * Mar. 23, 1993

[54] METHOD FOR RAPIDLY MEASURING THE TEMPERATURE OF A WORKPIECE ON A COORDINATE MEASURING APPARATUS

[75] Inventors: Eckhard Enderle, Aalen-Dewangen; Michael Wirth; Bernd Baier, both of Aalen, all of Fed. Rep. of Germany

[73] Assignee: Carl-Zeiss-Stiftung, Heisenheim, Fed. Rep. of Germany

[*] Notice: The portion of the term of this patent subsequent to Apr. 30, 2008 has been disclaimed.

[21] Appl. No.: 804,059

[22] Filed: Dec. 9, 1991

[30] Foreign Application Priority Data

Dec. 10, 1990 [DE] Fed. Rep. of Germany ....... 4039336

[51] Int. Cl.$^5$ ..................... G01K 1/14; G01K 13/00; G01D 3/04
[52] U.S. Cl. ................... 374/142; 374/102; 33/702; 33/DIG. 19; 33/560
[58] Field of Search ............... 33/503, 504, 556, 557, 33/558, 559, 560, 561, 702, 704, DIG. 19; 374/141, 142, 102, 134

[56] References Cited

U.S. PATENT DOCUMENTS

| | | | |
|---|---|---|---|
| 2,956,344 | 10/1960 | Rantsch | 374/141 |
| 3,142,120 | 7/1964 | Mottu | 33/702 |
| 3,332,153 | 7/1967 | Loewen | 33/702 |
| 3,878,724 | 4/1975 | Allen | 374/134 |
| 4,177,568 | 12/1979 | Werner et al. | 33/DIG. 2 |
| 4,592,000 | 5/1986 | Ishisaka et al. | 374/102 |
| 4,727,500 | 2/1988 | Jackson et al. | 374/102 |
| 4,888,877 | 12/1989 | Enderle et al. | 33/559 |
| 4,997,287 | 3/1991 | Tittl | 374/141 |
| 5,011,297 | 4/1991 | Tittl | 374/141 |

FOREIGN PATENT DOCUMENTS

| | | | |
|---|---|---|---|
| 3729644 | 3/1989 | Fed. Rep. of Germany | 33/702 |
| 3823373 | 1/1990 | Fed. Rep. of Germany | . |
| 2384230 | 10/1978 | France | . |
| 0103367 | 8/1979 | Japan | 33/704 |

Primary Examiner—William A. Cuchlinski, Jr.
Assistant Examiner—Diego F. F. Gutierrez
Attorney, Agent, or Firm—Walter Ottesen

[57] ABSTRACT

The invention is directed to a temperature measuring head for rapidly measuring the temperature of a workpiece on a coordinate measuring apparatus. To rapidly measure the temperature of the workpiece, the coordinate measuring probe element is exchanged for a temperature measuring head which operates pursuant to the principle of a switching probe head. The measuring head supplies a contact signal after contact with the workpiece takes place. From this time point on, the temperature variation is measured by the temperature measuring head and the determined values are stored in the computer of the coordinate measuring apparatus. The temperature of the workpiece is extrapolated via a numerical evaluation method from a specific measurement interval. After the necessary measurement interval, the temperature measuring head is exchanged for the needed probe element combination. The invention is also directed to a temperature measuring head for carrying out the method of the invention.

8 Claims, 4 Drawing Sheets

METHOD FOR RAPIDLY MEASURING THE TEMPERATURE OF A WORKPIECE ON A COORDINATE MEASURING APPARATUS

FIELD OF THE INVENTION

The invention relates to a method for rapidly measuring the temperature of a workpiece on a coordinate measuring apparatus with the aid of a temperature measuring head applied to the workpiece. The invention also relates to the temperature measuring head with which the method of the invention is carried out.

BACKGROUND OF THE INVENTION

For high precision length measurements in coordinate measurement technology, it is necessary that the temperature of the workpiece be detected in the course of the measurement in order that length changes of the workpiece caused by temperature can be computer corrected. This becomes evermore significant as the use of coordinate measuring apparatus is shifted more and more from highly climatized fine measurement rooms into manufacturing areas where large temperature fluctuations are possible.

The workpiece temperatures are detected with contact thermometers which are applied to the object to be measured. Generally, these contact thermometers are precision resistors which are applied to the workpiece utilizing various attachment devices. In addition to manually applied contact sensors, U.S. Pat. No. 5,011,297 discloses an automatic version of detecting the temperature of workpieces.

U.S. Pat. No. 5,011,297 describes the exchange of the coordinate measuring probe for a temperature sensor component with the aid of a probe changing system. This temperature sensor is resiliently biased against the workpiece with the aid of the measuring arm of the coordinate measuring apparatus and maintains the contact to the workpiece for a time and thereafter supplies the determined temperature measurement values to the computer of the coordinate measuring apparatus. In this method, a check is made by means of a plausibility control of the detected measurement values as to whether the sensor is actually in contact with the object to be measured. However, no temperature change at the sensor takes place for the same sensor temperature and workpiece temperature so that no definite answer can be obtained as to whether reliable contact has been made between the sensor and the object. A further difficulty is in the fixing of the measurement duration, that is, the contact time during which the sensor is in contact engagement with the workpiece. For large temperature differences between sensor and workpiece, more time is needed until the sensor assumes the temperature of the workpiece. Accordingly, in order to be certain that the actual workpiece temperature has been detected, it is necessary to set longer measurement intervals which negatively affects the desired short measurement times.

SUMMARY OF THE INVENTION

In view of the foregoing, it is an object of the invention to rapidly and reliably detect the temperature of a workpiece with the aid of a probing temperature measuring head.

The method of the invention for rapidly measuring the temperature of a workpiece on a coordinate measuring apparatus is achieved with the aid of a temperature measuring head applied to the workpiece. The measuring head includes switching means for issuing a signal when contact is made with the workpiece and the method includes the steps of: determining the time point at which the temperature measuring head comes into contact engagement with the workpiece as indicated by the above-mentioned signal; measuring the temperature of the workpiece for a time interval after said time point to obtain a curve of temperature variation as a function of time; and, extrapolating from the curve to the actual value of the temperature of the workpiece with the aid of a numerical evaluation process.

As described in U.S. Pat. No. 5,011,297, a coordinate measuring apparatus is also here required having an automatic probe element changing arrangement which changes the coordinate measuring probe element for a special temperature measuring head which is held in operational readiness in a corresponding magazine. In contrast to the sensor described in U.S. Pat. No. 5,011,297, a temperature measuring head is utilized however which is assembled pursuant to the known principle of a switching probe head as described for example in U.S. Pat. No. 4,177,568 incorporated herein by reference. The time point of contact with the workpiece is registered by a signal generated when lifting the movable part of the probe head out of its bearing. A special evaluation method permits extrapolation to the actual workpiece temperature from a short measurement interval in which the temperature varies without it being necessary to wait until the sensor has assumed the actual temperature of the workpiece. By registering the contact time point as well as the special evaluation method, a short measuring time is obtained with simultaneous reliability that the sensor is actually in contact engagement with the workpiece. With the aid of the special evaluation method, a shortening of the measurement time by a factor of 5 to 6 is possible in comparison to a measurement wherein it must be awaited until the sensor reaches the temperature of the workpiece. A reliable flat contact engagement of the sensor on the workpiece is ensured by a second deflecting position in the deflectable part of the temperature measuring head, that is, workpiece surfaces which are inclined even more can now be reliably contacted. Furthermore, it is advantageous to attach the temperature measuring head so as to be rotatable or pivotable on the measuring arm such as described in U.S. Pat. No. 4,888,877 incorporated herein by reference. The temperature measuring head can be aligned in advance with reference to the side of the workpiece to be contacted.

With the aid of such a temperature detecting method, it is possible to correct the measured length measuring values by a possible thermal expansion. With respect to U.S. Pat. No. 5,011,297, it is necessary to provide a modification in the temperature detection and evaluation software such that the temperature variation is indicated only after contact with the workpiece and that the workpiece temperature is extrapolated from the variations indicated within a measuring interval.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
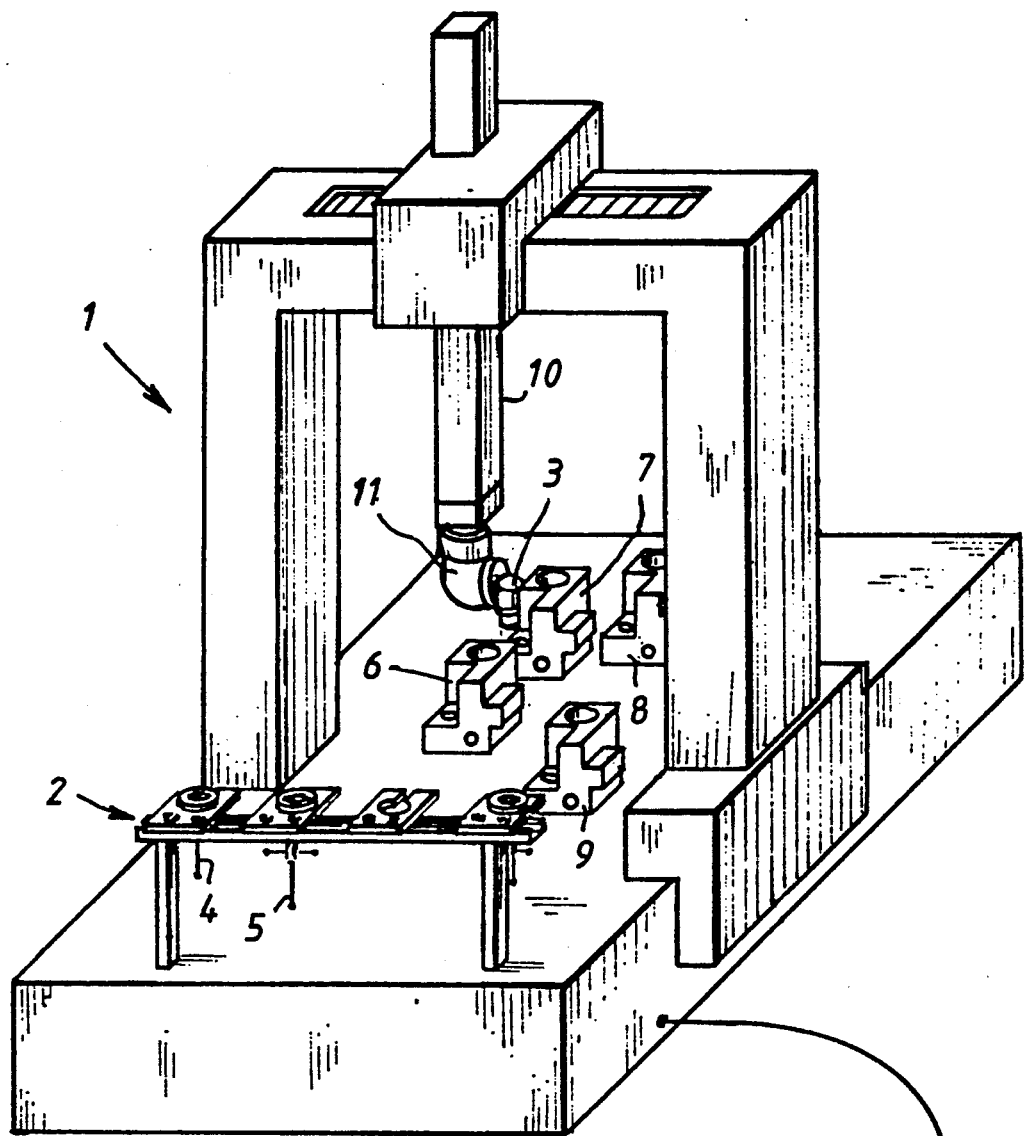
FIG. 1 is a perspective view of a coordinate measuring apparatus equipped with a probe element changing arrangement including a magazine and a temperature measuring head which has been exchanged for a probe element.
Figure 1:
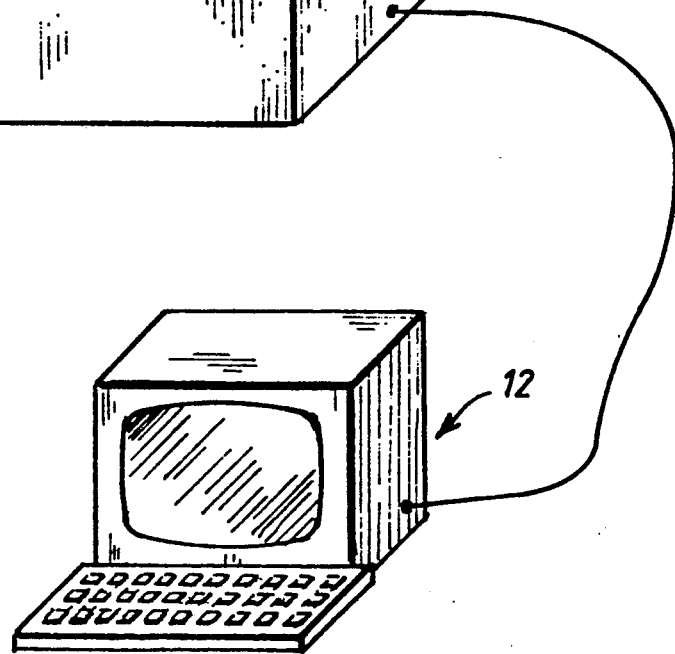

The combination shown in FIG. 1 with coordinate measuring apparatus 1, magazine 2 and the temperature measuring head 3 is known per se from U.S. Pat. No. 5,011,297 incorporated herein by reference.

Figure 4:
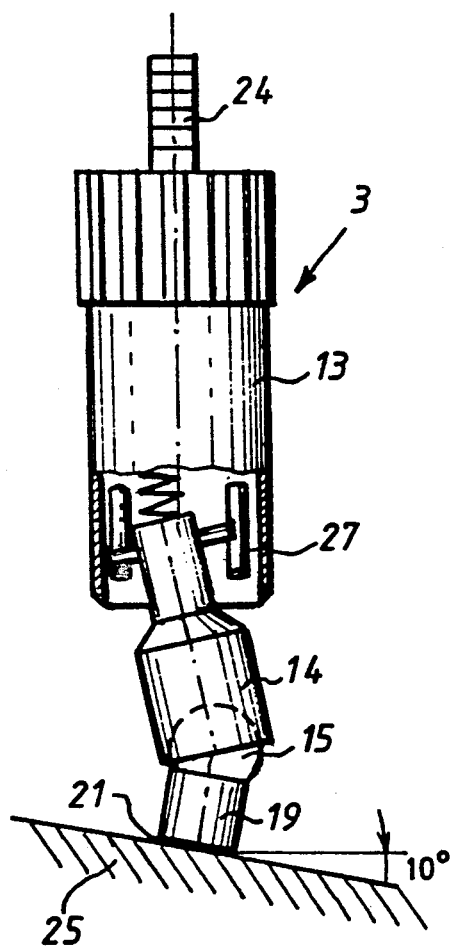
FIG. 4 shows the temperature measuring head of FIG. 2 in contact engagement with a workpiece having an inclined surface; and, FIG. 5 is a graphic evaluation of a measurement wherein the temperatures of the workpiece and the temperature measuring head have been separately detected and plotted.

Various probe element combinations (4, 5) as well as a temperature measuring head 3 are held in operational readiness in the magazine 2 of the coordinate measuring apparatus 1 during the measurement. If a temperature measurement at one of the clamped workpieces (6, 7, 8, 9) is to be undertaken, then the measuring arm 10 travels to the magazine 2 and exchanges the coordinate measuring probe element (4, 5) for the temperature measuring head 3. Thereafter, the measuring arm 10 travels back to the workpieces (6, 7, 8, 9). Thereafter, the alignment of the temperature measuring head 3 with reference to the surface of the workpiece takes place. This can be performed with the aid of a rotate-pivot unit 11 on the measuring arm 10 by the operator of the coordinate measuring apparatus or in the context of a corresponding programmed measuring sequence. Thereafter, contact with the surface of the workpiece is made by applying the contact surface 21 of the temperature measuring head to a planar surface of the workpiece. The time point of the workpiece contact is registered by the temperature measuring head 3 by means of a contact pulse. A contact pulse of this kind can be triggered by deflecting the movable measuring head 14 out of its bearing 27 in the fixed part 13 of the measuring head as shown in FIG. 4. From this time point on, the detected temperature measurement values are transmitted to the computer 12 of the coordinate measuring apparatus and stored. After a needed measuring duration, the measuring arm 10 travels again to the magazine 2 and exchanges the temperature measuring head 3 for the probe element combination (4, 5) needed for the further coordinate measuring program.

A numerical evaluation method to be described hereinafter is utilized to extrapolate the temperature of the workpiece from the temperature variations determined over a measurement interval. With the aid of the determined temperature, the temperature dependent length expansion of the workpiece is corrected by appropriate software in that the coordinate measurements which have been carried out correspond to the temperature measurements at, for example, 20° C.

Figure 2:
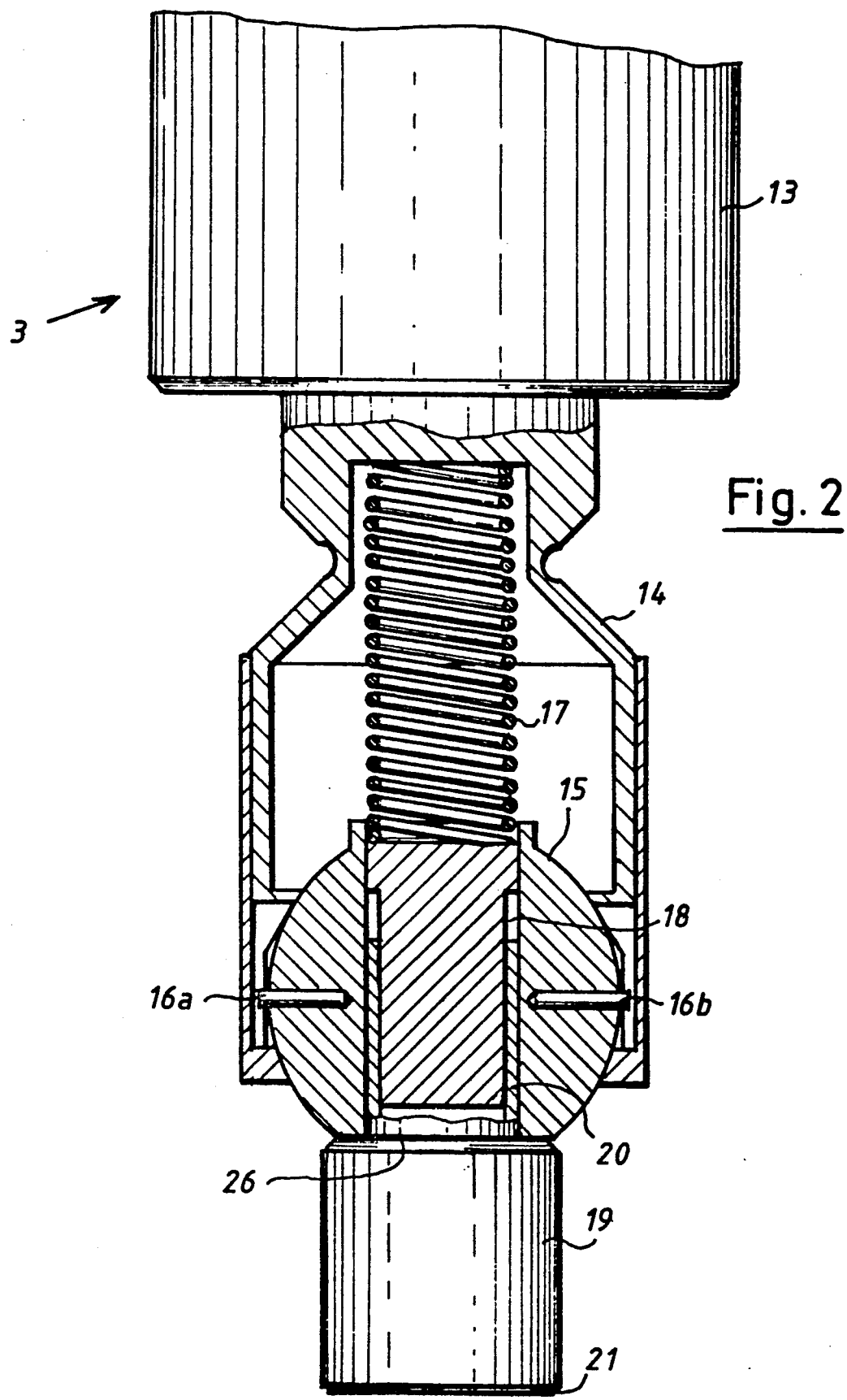
FIG. 2 is a side elevation view of a temperature measuring head with the portion of the housing broken away to show the ball joint.

In FIG. 2, a temperature measuring head 3 is shown which is needed for a temperature detection method of this kind. The temperature measuring head 3 is assembled according to the known principle of the switching probe head and comprises a part 13 fixed in a housing and a movable deflectable part 14. The contact pulse is triggered when the movable measuring head part 14 is deflected out of its bearing 27 in the fixed part 13 with the contact pulse controlling the actual measurement value detection.

Embodiments of switching means suitable for issuing a signal to mark the time point when contact is made with the workpiece are disclosed in detail in U.S. Pat. No. 4,177,568 incorporated herein by reference. For example, FIG. 11 of this patent shows a concave mirror 65 mounted on an intermediate plate 68 to which movement is imparted by the movable part 63 when the latter strikes a workpiece. The mirror 65 focuses light from a source 66 mounted on the fixed part 62 to a receiver 67 also on the fixed part. When the movable part 63 is deflected, movement is imparted to the intermediate plate 68 and therefore to mirror 65 and the receiver 67, for example, a four-quadrant photodiode, supplies a signal indicating that contact with the workpiece has been made.

The lower end of the measuring head part 14 is deflectable and is configured in the form of a sleeve. A ball joint 15 is provided on this lower end and defines a second deflecting position in the measuring head system. Two cylinder pins (16a, 16b) are fixed on the sleeve part 14 and prevent a rotation of the ball joint 15 about the longitudinal axis of the measuring head. The ball joint 15 is held at rest in a center position with the aid of a spring 17 in the upper sleeve part. Furthermore, the spring 17 provides for a return into the center position after a deflection of the ball joint 15.

In the embodiment shown, the ball joint 15 includes a holding insert 18 for the temperature sensor 19 and the measurement element leads 23. The ball joint has a planar contact face 26 at its lower end toward the temperature sensor 19. Alternatively, a non-separable connection between the ball joint 15 and the temperature sensor 19 would be possible.

Figure 3:
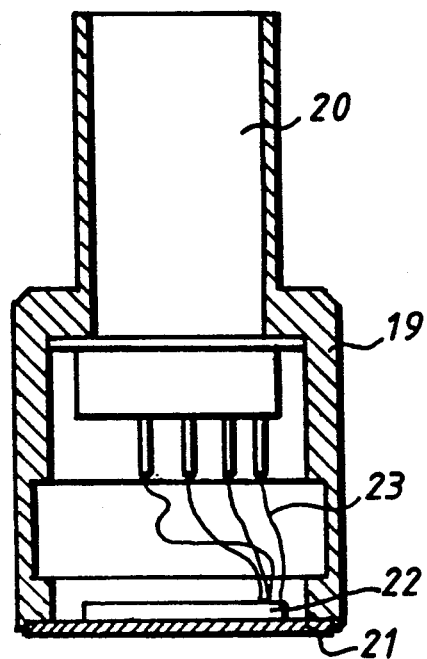
FIG. 3 is a side elevation view, in section, of the temperature sensor.

The assembly of the temperature sensor 19 is shown in FIG. 3. The sensor 19 is configured as a further sleeve part 19 and is configured as a counterpart 20 to the holding insert 18 of the ball joint thereby permitting the insertable attachment at the ball joint 15. A contact plate 21 is disposed at the lower end of the sleeve part 19 of the temperature sensor. The actual measuring element 22 is attached to the rearward side of plate 21. The contact plate 21 comprises a material of good thermal conductivity of $\lambda \geq 380$ W/Km and low heat capacity such as copper and can additionally be silvered in order to shield out heat radiation from the ambient and provide a good heat conductivity from the workpiece to the contact plate 21. The measuring element 22 such as a Pt 100 measuring resistor such as made by the Degussa Company of Frankfurt, Germany and sold under the product designation GR 2102 is attached to the contact plate with heat conductive adhesive in order to ensure a good heat transfer from the contact plate 21 to the measuring element 22. The leads 23 of the measuring element 22 are passed through the counterpart 20 in the temperature sensor 19 and the holding insert 18 of the ball joint 15 into the upper movable measuring head part 14 and then led through the fixed housing part 13 to the measuring head 24.

In FIG. 4, the temperature measuring head 3 is shown in contact engagement with the surface 25 of a workpiece which is somewhat inclined. The ball joint 15 in the deflected measuring head part 14 defines a second deflecting position in the measuring head system and ensures the necessary flat contact engagement of the temperature sensor 19 on the workpiece surface 25. Without this second deflecting position 15, only an inclination of approximately 2° of the workpiece surface with respect to the symmetry axis of the measuring system would be possible. The additional ball joint deflecting position 15 permits an accommodation of up to approximately 10° of inclination and thereby establishes the necessary surface contact of the measuring sensor 19 to the workpiece. Furthermore, FIG. 4 shows how the deflectable measuring head part 14 lifts out of its bearing 27 in the fixed measuring head part 13 to trigger the contact pulse.

The temperature measurement by the temperature sensor takes place after the contact between the temperature sensor 19 and the workpiece has been determined by the measuring head signal. The determined measurement values are transmitted to the computer of the coordinate measuring apparatus 12 and stored. With the aid of a special evaluation method, it is possible to interrupt the temperature measurement before reaching the actual workpiece temperature and to extrapolate from the stored temperature variations after contact with the workpiece to the workpiece temperature.

Figure 5:
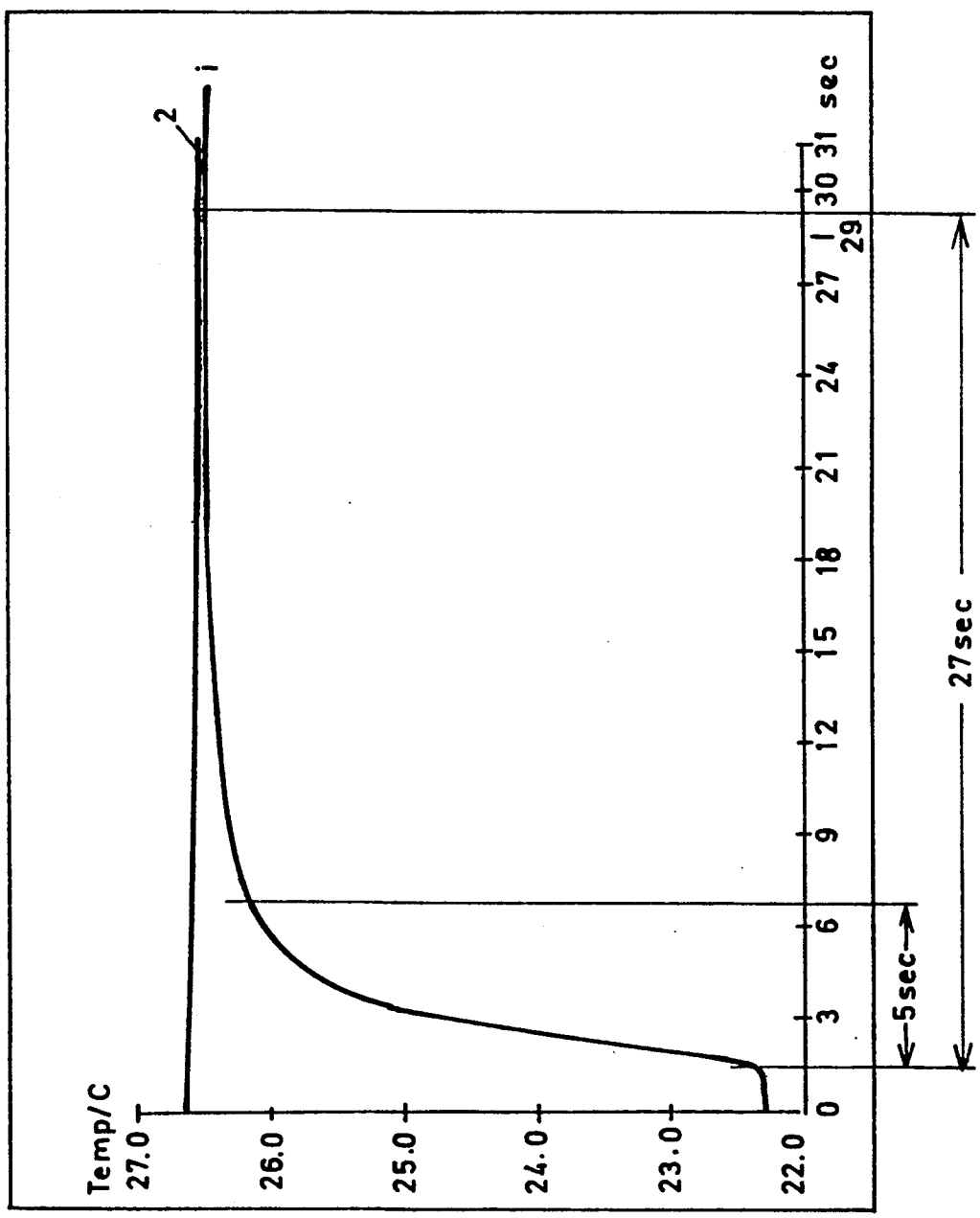

The temperature trace showing temperature variations at the temperature sensor 19 is shown by curve 1 in FIG. 5; whereas, curve 2 shows the workpiece temperature during the measurement operation. The pronounced bend after approximately 1 to 2 seconds in curve 1 marks the time point of the contact between the measuring sensor 19 and the object being measured. In this measurement example, the contact to the workpiece must be maintained approximately 27 seconds until the temperature sensor has assumed the actual temperature of the workpiece. With the aid of the special evaluation method according to the invention, a contact time of approximately only 5 seconds after contact with the workpiece is sufficient in order to extrapolate to the actual workpiece temperature.

For this purpose, the measured temperature variation $T_F(t)$ is adapted to a function in the form of:

$$T_F(t) = T_{WS}(1 - e^{-t/\tau})$$

wherein:

$T_F$ = sensor temperature
$T_{WS}$ = temperature of the workpiece
t = measurement duration
$\tau$ = constant specific to the contact and dependent upon the material The curve is adapted via a numerical evaluation process to a pregiven function to determine the adaption parameters of the function by utilizing the measured values obtained in a predetermined time interval measured from the time point of the contact between the measuring sensor 19 and the object being measured. The actual temperature of the workpiece is one of the adaption parameters.

Numerical evaluation processes are well known and are exemplified by the process described in the text entitled "Practical Methods of Optimiation" by R. Fletcher, pages 91 to 93, John Wiley & Sons (1980).

From the adaptation, the two adaptation parameters $T_{WS}$ and $\tau$ are obtained with $T_{WS}$ being the temperature of the workpiece which adjusts after a sufficiently long measurement duration whereas $\tau$ is a quantity specific to the particular contact. With this evaluation method, an extrapolation of the workpiece temperature having a precision of 0.1 K is possible with a shortening of the measurement duration by a factor of 5 to 6 compared to the temperature sensor reaching the actual temperature of the workpiece.

The workpiece temperature determined in this way can be used to correct the temperature dependent linear expansion of the workpiece.

It is understood that the foregoing description is that of the preferred embodiments of the invention and that various changes and modifications may be made thereto without departing from the spirit and scope of the invention as defined in the appended claims.

What is claimed is:

1. A temperature measuring head for rapidly measuring the temperature of a workpiece on a coordinate temperature measuring head to the workpiece, the temperature measuring head comprising:

a fixed housing part connectable to the measuring arm of the apparatus;

a movable part;

connecting means for connecting said movable part to said housing part so as to permit movement of said movable part relative to said housing part when said movable part comes into contact engagement with the workpiece;

switching means for issuing a signal for marking the time point at which said contact engagement occurs;

temperature sensing means mounted in said movable part for measuring the temperature of the workpiece starting at said time point to obtain measured values over a predetermined time interval after said time point;

computer means for receiving said signal for initiating temperature measurements over said predetermined time interval and for receiving and adapting said measured values to a predetermined function defining the temperature of said sensing means as a function of time; and, said computer means being adapted to extrapolate said function to compute the actual temperature of the workpiece.

2. The temperature measuring head of claim 11, said movable part having a lower end and the temperature measuring head further comprising ball joint means on said lower end for holding said sensing means and being movable from a centered first position to a second position wherein said sensing means is deflected with respect to said movable part to facilitate contact with the workpiece.

3. The temperature sensing head of claim 2, further comprising resilient biasing means for biasing said ball joint into said first position.

4. The temperature sensing head of claim 3, said sensing means including: a sleeve member having an upper end and a lower end; a sensor mounted in said lower end of said sleeve member; and, an insert portion mounted on said upper end of said sleeve member; and, said ball joint including holding means for receiving and holding said insert portion.

5. The temperature sensing head of claim 4, said sensing means further including a contact plate on said lower end of said sleeve member for contact engaging the workpiece; said contact plate having a rearward side facing into said sleeve member; said sensor being attached to said rearward side; and, said contact plate having a heat conductivity of $\lambda \geq 38$ W/Km and a low heat capacity.

6. A temperature measuring arrangement for rapidly measuring the temperature of a workpiece on a coordinate measuring apparatus with the aid of a temperature measuring head applied to the workpiece, the measuring head including switching means for issuing a signal when contact is made with the workpiece, the arrangement comprising:

means for determining the time point at which the temperature measuring head comes into contact engagement with the workpiece as indicated by said signal;

means for measuring the temperature of the workpiece for a predetermined time interval after said time point to obtain measured values defining a curve of temperature variation as a function of time;

computer means for receiving said signal for initiating temperature measurements over said predetermined time interval and for receiving and adapting said measured values to a predetermined function defining the temperature of said sensing means as a function of time; and, said computer means being adapted to extrapolate said function to compute the actual temperature of the workpiece.

7. The arrangement of claim 6, wherein said computer means has a memory for storing said curve and said arrangement further comprises:

a measuring probe and a magazine for holding the measuring probe;

means for exchanging the measuring probe for the temperature measuring head;

means for aligning a workpiece contact surface of the temperature measuring head with a contact surface of the workpiece;

means for bringing said contact surfaces into contact engagement with each other;

means for fixing the time point of said contact engagement with said signal of said switching means; and, means for transmitting the measured values of temperature obtained during said time interval to the computer for storing the same.

8. The arrangement of claim 6, wherein said curve is adapted via a numerical evaluation process to a pregiven function to determine the adaptation parameters of said function by utilizing the measured values obtained in said predetermined time interval and wherein the actual temperature of the workpiece is one of said adaptation parameters.

* * * * *

UNITED STATES PATENT AND TRADEMARK OFFICE
CERTIFICATE OF CORRECTION

PATENT NO. : 5,195,826

DATED : March 23, 1993

INVENTOR(S) : Eckhard Enderle, Michael Wirth and Bernd Baier

It is certified that error appears in the above-identified patent and that said Letters Patent is hereby corrected as shown below:

On the title page, under "Assignee", item [73]: delete "Heisenheim" and substitute -- Heidenheim -- therefor.

In column 5, line 41: delete ":".

In column 5, line 56: delete "adaption" and substitute -- adaptation -- therefor.

In column 5, line 59: delete "Optimiation" and substitute -- Optimization -- therefor.

In column 6, line 13: after "coordinate", insert -- measuring apparatus having a measuring arm for moving the --.

In column 6, line 42: please delete "11," and substitute -- 1, -- therefor.

In column 6, line 67: please delete "38" and substitute -- 380 -- therefor.

Signed and Sealed this

Sixteenth Day of November, 1993

Attest:

BRUCE LEHMAN

Attesting Officer

Commissioner of Patents and Trademarks